March 19, 1968 S. KESSLER 3,373,996

CARTRIDGE MOUNTING ASSEMBLY

Filed Aug. 25, 1965

INVENTOR.
Seymour Kessler
BY John J. Pederson
Attorney

United States Patent Office 3,373,996

Patented Mar. 19, 1968

3,373,996

CARTRIDGE MOUNTING ASSEMBLY

Seymour Kessler, Wilmette, Ill., assignor to Zenith Radio Corporation, Chicago, Ill., a corporation of Delaware Filed Aug. 25, 1965, Ser. No. 482,403
5 Claims. (Cl. 274—24)

The present invention relates generally to phonographs, and more particularly, to an improved pick-up cartridge assembly therefor.

A pick-up cartridge or translating device for reproducing audio information from grooved recording discs conventionally comprises a stylus element for physically following the modulated walls of the record grooves, one or more transducing elements coupled to the stylus and responsive to movement thereof for developing proportional electrical signals and a casing for supporting this structure. Usually the casing is of a bipartite construction having appropriate mated channels in each section thereof for accepting and accurately locating the transducer element or elements, a part of which also extend exteriorly of the casing to engage a cantilever stylus via an appropriate yoke or coupling element.

In the assembly of such cartridges, the sections of the casing, after location and perhaps affixation of the several components in the channels thereof, may be riveted to one another or riveted in addition to a mounting bracket adapted in turn for affixation to the phonograph tone arm, but regardless of the specific means used to maintain the assembled relation of the components, they are in practice generally joined such that disassembly of the structure involves substantial effort or skill or is not possible without damage to the cartridge and/or related elements. In addition, assembly of the cartridge casing sections usually requires a machine operation, and, because of the permanency of the affixation between the sections and one or more interior components, necessitates from a practical economic viewpoint discarding of the entire cartridge assembly if one or more of the components thereof is subsequently found to be faulty or misaligned. Further, once the cartridge assembly has been mounted within the tone arm, it is usually quite inconvenient to remove it as may be required during the production testing operation if it is discovered not to comply with quality standards, or for the consumer or repairman to remove the cartridge from the tone arm for replacement or repair purposes.

It is therefore an object of the present invention to provide a new and improved pick-up cartridge assembly.

It is another object of the present invention to provide an improved pick-up cartridge assembly which may be easily removed from its location within the tone arm for repair or replacement.

It is a further object of the present invention to provide a pick-up assembly which may be quickly and non-destructively disassembled to permit replacement or adjustment of one or more of the components thereof.

In accordance with the invention, in a phonograph for reproducing sound from records a tone arm and cartridge assembly comprises a first cartridge casing section and a second cartridge casing section for mating with the first section, at least one of the casing sections having a notch extending at least partially across one side thereof, and at least one of the sections having a channel formed therein, the casing sections thereby defining in assembled relation an interior cavity. Transducer means occupies this cavity and at least a portion thereof extends exteriorly of the casing to operatively embrace a record engaging stylus for developing an electrical signal proportional to the mechanical movement of the stylus. Bracket means are provided for singularly maintaining the cartridge casing sections in assembled relation and comprise a first surface portion adjacent the side of one of the casing sections opposite that mating with the other of the casing sections and having a sidee portion extending from the first surface portion and terminating in an inwardly facing portion, the first surface portion of the bracket having bias means engaging the adjacent casing section for yieldably urging the assembled cartridge into engagement with the inwardly facing portion and preventing movement of the cartridge with respect to the bracket means when the inwardly facing portion resides in the notch of the one casing section and whereby the assembled cartridge is easily withdrawn from the bracket by simultaneously forcing the cartridge upward against the bias means and longitudinally with respect to the bracket Means including this bracket are provided for mounting the cartridge to the tone arm.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 1:
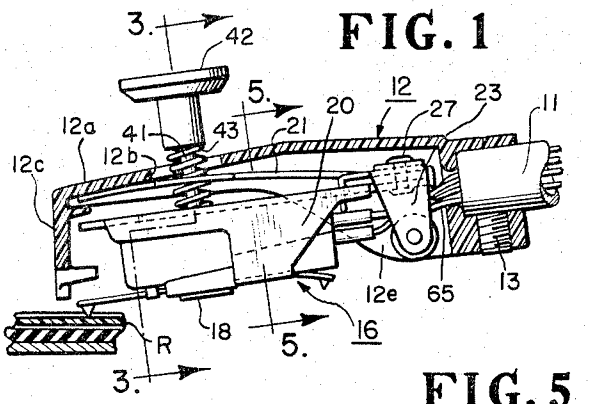
FIGURE 1 is a fragmentary view, partly in section, of a phonograph tone arm and cartridge assembly embodying the present invention and shown tracking a record disc.

Referring now to FIGURE 1, a tone arm and cartridge assembly embodying the present invention is shown with the stylus of the cartridge in its operative position tracking a record disc R. Specifically, a terminal portion 11 of an elongated tubular tone arm section is received by a recess in a cartridge housing 12 and is held fast thereto by a set screw 13. The remainder of the tone arm, its pivotal support, and the phonograph turntable are not shown; however, it is understood that they may be of any known design. Compartment 12 of the tone arm comprises an upper surface **12*a* apertured at 12*b*, a depending front wall 12*c* and a pair of opposed side walls 12*d*, 12*e* (FIGURE 3), each of which is partially cut away as illustrated by wall 12*e* in the sectioned drawing of FIGURE 1. The appearance of compartment 12** forms no part of the present invention, but in conjunction with the remainder of the tone arm (not shown) is disclosed and claimed in a design application of Melvin H. Boldt, Ser. No. 83,555, filed Jan. 25, 1965, and assigned to the same assignee as the present invention.

Figure 2:
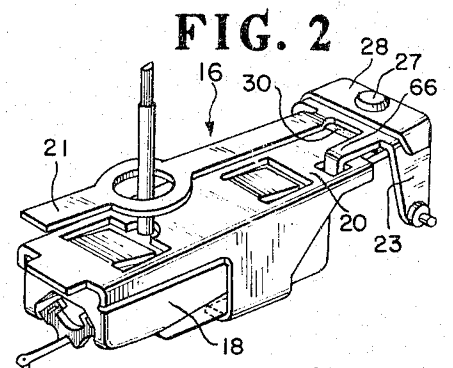
FIGURE 2 is a perspective view of the cartridge and mounting assembly as viewed when withdrawn from the tone arm.
Figures 3, 4, 5, 6, 7:
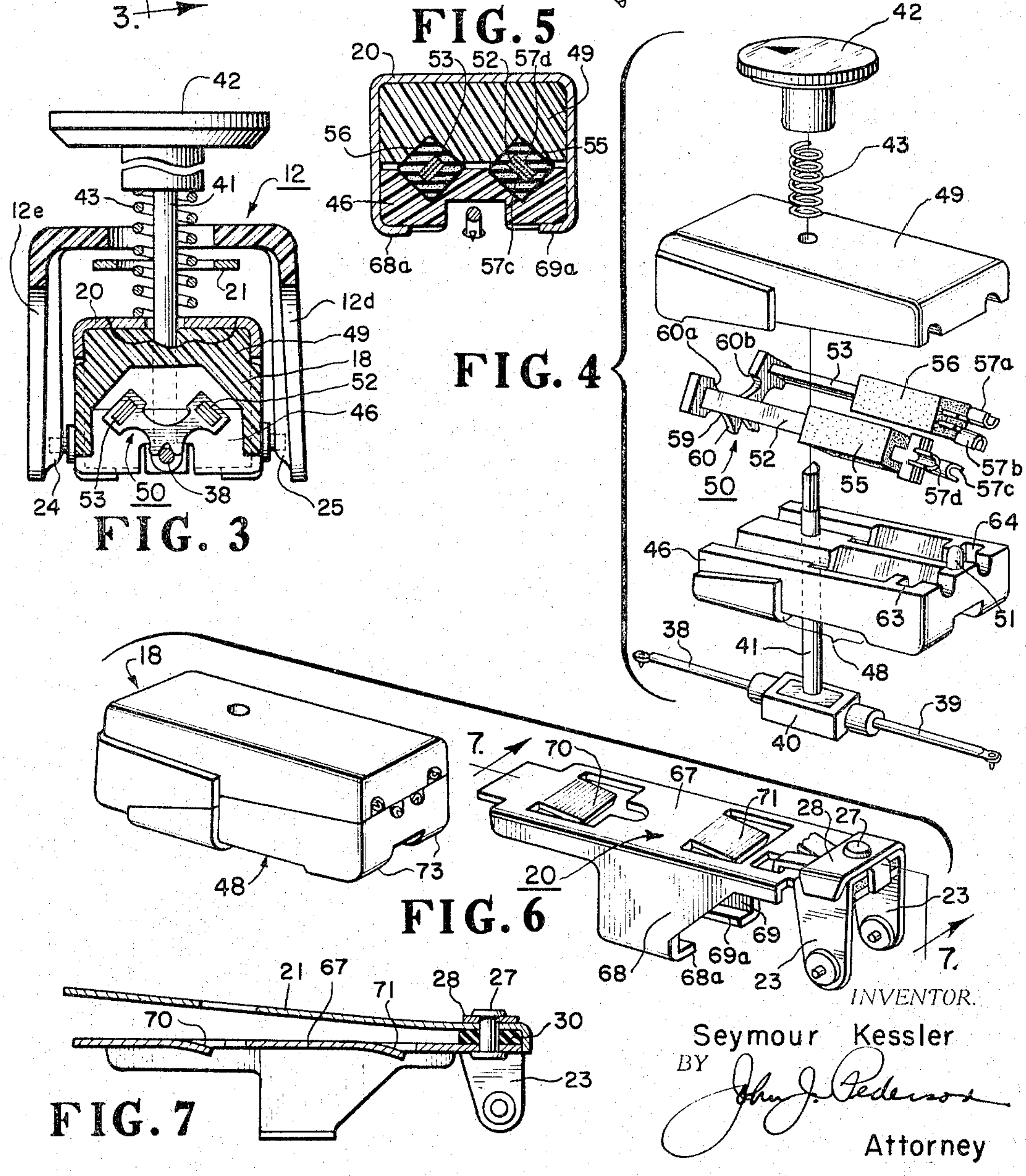
FIGURE 3 is a sectional view taken along line 3—3 of FIGURE 1.
FIGURE 4 is an exploded perspective view of the pick-up cartridge.
FIGURE 5 is a sectional view taken along line 5—5 of FIGURE 1.
FIGURE 6 is a perspective view showing the assembled cartridge casing in position for insertion into the mounting bracket.
FIGURE 7 is a sectional view taken along section line 7—7 of FIGURE 6.

A cartridge assembly shown generally at 16 in FIGURE 1, and illustrated in more detail in FIGURE 2, is mounted to the tone arm between the side walls of housing 12. Specifically, this assembly comprises a pick-up cartridge 18, bracket means 20 and means, including a cantilever spring member 21 and a U-shaped mounting member 23 integral with member 21, for mounting the cartridge and bracket sub-assembly to the tone arm. Mounting member 23 is fastened to cartridge holding bracket 20 via a rivet 27 which maintains in sandwiched relationship as shown in FIGURE 2 a stiffener plate 28, member 23, an elastomer layer 30 which lessens the transmittal of spurious vibrations from the tone arm to cartridge 18 and the trailing edge of bracket means 20. The terminal portion of each leg of U-shaped member 23 has mounting provisions thereon which are received by spaced opposed bearings 24, 25 in the wall of cartridge casing 12 as illustrated in FIGURE 3, thereby mounting the cartridge assembly for pivotal rotation about a horizontal axis defined by the transversely aligned mounting provisions. Integral with mounting member 23 is an elongated cantilever spring 21 which is adapted to engage the upper interior surface of cartridge housing 12 and resiliently bias the cartridge downward therefrom about its pivotal axis to an operating position as shown in FIGURE 1. It will be appreciated that spring 21 must be of a sufficient stiffness to bias the cartridge to its operating position intermediate upper and lower limiting positions under the influence of the normal counterbalanced weight of the tone arm structure, but exhibit sufficient resilience to allow retraction of the cartridge within the protective confines of the housing upon application of abnormal forces to the tone arm or stylus. Further details and advantages of this structure for pivotally and resiliently mounting the cartridge assembly to the tone arm are illustrated and claimed in a concurrently filed application of Richard Hathaway, Ser. No. 482,449 and assigned to the same assignee as the present invention, while a further but in some respects similar mounting arrangement is disclosed and claimed in a reissue application to Sioles et al., Ser. No. 279,046, filed May 7, 1963, and assigned to the same assignee as the present invention.

Cartridge 18, illustrated in FIGURE 1 and in the exploded view of FIGURE 4, is of the turret variety comprising a dual stylus assembly including a pair of oppositely extending cantilever stylus arms 38, 39 which are supported by a rubber-like member 40 and a turret post 41, butted in member 40 and projecting upwardly through a central bore in casing 18 and through coaxial opening 12*b* in top wall 12*a* of compartment 12. Turret post 40 carries at its terminus a knob 42 which may be employed upon depression thereof against the bias of a coil spring 43 to rotate one or the other of the styli 38, 39 to a position appropriate for playback of record R. It is to be understood, however, that other types of cartridges including those having only a single stylus may be employed in accordance with the teachings of the present invention.

In essence, cartridge 18 comprises, as shown most clearly in FIGURE 4, a first or lower casing section 46 and a second or upper casing section 49 mating with section 46, one or both of the sections having a channel for accommodating and accurately locating transducer means indicated generally at 50 and at least one of the sections being provided with a notch extending at least partially across one side thereof. In the preferred embodiment shown, each of casing sections 46, 49 has an identical pair of adjacent channels formed in one face and lower section 46 is provided with a notch 48 extending transversely across the entirety of its underside. In addition, the sections are provided with key and slot arrangement for preventing longitudinal movement of the casing sections with respect to one another when these sections are placed in juxtaposition. As herein illustrated in FIGURE 4, a finger 51 extends from lower section 46 to engage a mating depression (not shown) in upper section 49 to preclude such movement. Casing sections 46 and 49 may most conveniently be formed of a molded plastic material such as polystyrene.

Transducer means 50 is capable of developing a monaural or stereophonic signal from the motion components imparted to it by stylus 38, although such is by no means a limitation on the invention, and it is understood that an exclusively monaural reproducing element may be employed. Means 50 comprises a pair of elongated flexion arms 52, 53 each of which may consist of a barium titanate ceramic bimorph element prepolarized to generate a voltage which varies in proportion to the magnitude of applied transverse stresses. One end of each of the transducing members is received in a respective one of a pair of longitudinally slotted mounting blocks 55, 56 of rectangular cross-section, each of which is composed of an appropriate elastomeric damping material, such as rubber. Blocks 55, 56 are diagonally seated in a first portion of their respective channels while the transducing elements are accommodated by a forwardly extending portion of the channel, as seen in FIGURES 4 and 5. This orientation for the mounting blocks has been found to be best for minimizing extraneous stresses on the transducing elements. Conductive terminals 57*a*, 57*b* and 57*c*, 57*d* are received in the opposite ends of the respective damping blocks 55, 56 and are positioned to engage the conventional surface electrodes on opposite sides of the transducing element as shown in FIGURE 5. The several terminals are passed by a channel portion extending rearwardly of that receiving the mounting blocks and are prevented from longitudinal movement within channel by virtue of engagement of transverse hilt portions of the terminals with slots 63, 64 of casing section 46 and like slots (not shown) in upper adjacent section 49. The terminals project exteriorly of the casing through respective U-shaped openings which are formed to allow considerable clearance for the terminals thereby preventing binding of the terminals which would adversely affect performance of the cartridge. These terminals couple to electrical leads 65 (FIGURE 1) which are threaded through hollow tone arm section 11 to appropriate amplifying and reproduction means (not shown). A grounding tab 66 integral with member 23 electrically contacts one of leads 65.

At their opposite ends, transducers 52, 53 carry a flexible rubber yoke or collar 59 having an apical portion 60 which is notched to engage and embrace the cantilever portion of whichover of styli 38, 39 is selected for record playing purposes. Integral with portion 60 are coupling arms 60*a* and 60*b* which extend at right angles to each other and terminate in substantially rectangular slotted collar portions each one of which receives a respective one of the transducer elements 52, 53.

In accordance with the invention, the cartridge components of FIGURE 4, shown in assembled relation in FIGURE 6 except for the stylus turret, are maintained in assembled relation solely by insertion in bracket means 20. Means 20 comprises a first surface portion 67 adjacent the side of section 49 opposite that mating with section 46 and space opposed depending side portions 68, 69 each of which terminates in an inwardly facing portion or tabs 68*a*, 69*a*. The top surface of bracket 20 is provided with depending bias means, illustrated in the preferred embodiment of FIGURES 6 and 7 as cut-out depending bias tabs 70, 71 which are positioned in tandem and bent downwardly to engage casing section 49, for yieldably urging the assembled cartridge firmly into engagement with inwardly facing tabs 68*a* and 69*a* and for preventing longitudinal movement of the cartridge with respect to bracket means 20 when the tabs are received in notch 48 of section 46.

It is understood that bracket means 20 may take a variety of physical forms within the spirit of the present invention. For instance, tabs 68*a* and 69*a* may be joined to form an integral rectangular passage for the bracket, or only one side portion may be provided with an inwardly extending tab. Certain other particulars of bracket 20 are dictated by the illustrated tone arm mounting means, and may be omitted or modified to cooperate with the selected means for mounting the cartridge assembly to the tone arm.

From the views of FIGURES 6 and 7, it can be appreciated that the assembled cartridge casing 18 is moved longitudinally toward elongated bracket 20 and is easily slid into this bracket against the bias of tabs 70, 71 by virtue of a contoured surface 73 on the lower casing portion. Continued movement of cartridge 18 is unimpeded until the tabs reach notch 48 and snap into position thereby preventing further longitudinal movement of the casing with respect to the bracket. The assembled cartridge is easily withdrawn from the bracket by the simple expedient of simultaneously forcing the cartridge upward against the bias of tabs 70, 71 and longitudinally with respect to the bracket. This may be done most easily with properly applied thumb pressure. The assembled cartridge is not held together by any other means, all separate fasteners such as rivets being dispensed with. Thus, during production assembly, a machine operation can be eliminated and the cartridge casing and bracket means quickly hand or machine assembled and then installed in the normal manner within the tone arm. Further, if upon testing the phonograph after completion of its assembly, it is found that the transducing elements are improperly aligned, broken, or otherwise damaged, the cartridge can be quickly withdrawn from the bracket means and only the damaged or misaligned components adjusted or replaced rather than the cartridge in its entirety. Also, the consumer or repairman can likewise readily remove the cartridge from the tone arm mounting bracket by the use of properly applied thumb pressure.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a phonograph for reproducing sound from records, a tone arm and cartridge assembly comprising:

a first cartridge casing section;

a second cartridge casing section mating with said first section, at least one of said casing sections having a notch extending at least partially across one side thereof, and at least one of said casing sections having a channel formed therein, said casing sections defining in assembled relation an interior cavity;

a record engaging stylus;

transducer means occupying said cavity and having a portion thereof extending exteriorly of said casing to operatively engage said stylus for developing an electrical signal proportional to the physical movement of said stylus;

means for maintaining said cartridge casing sections in demountable assembled relation and consisting essentially of a bracket comprising a first surface portion adjacent the side of one of said casing sections opposite that mating with the other of said casing sections and having a side portion extending from said first surface portion and terminating in an inwardly facing portion, said first surface portion having bias means engaging said adjacent casing section for yieldably urging said assembled cartridge firmly into engagement with said inwardly facing portion and preventing movement of said cartridge with respect to said bracket means when said inwardly facing portion resides in said notch of one said casing sections and whereby said assembled cartridge is easily withdrawn from said bracket means by simultaneously forcing said cartridge upward against said bias means and longitudinally with respect to said bracket;

and means including said bracket means for mounting said cartridge to said tone arm.

2. In a phonograph for reproducing sound from records, a tone arm and cartridge assembly comprising:

a first elongated cartridge casing section having a notch extending at least partially across one side thereof;

a second elongated cartridge casing section mating with said first section, at least one of said casing sections having a channel formed therein, said casing sections defining in assembled relation an interior cavity;

means projecting from one of said casing sections and engaging the other of said sections for preventing longitudinal movement of said sections with respect to one another;

a record engaging stylus;

transducer means occupying said cavity and having a portion thereof extending exteriorly of said casing to operatively engage said stylus for developing an electrical signal proportional to the physical movement of said stylus;

means for maintaining said cartridge casing sections in demountable assembled relation and consisting essentially of an elongated bracket comprising a first surface portion adjacent the side of said second casing section opposite that mating with said first casing section and having a pair of opposed side portions depending from said first surface portion and terminating in inwardly facing tabs, said first surface portion having depending bias means engaging said second casing section for yieldably urging said assembled cartridge firmly into engagement with said tabs and preventing longitudinal movement of said cartridge with respect to said bracket when said tabs reside in said notch of said first casing section and whereby said assembled cartridge is easily withdrawn from said bracket means by simultaneously forcing said cartridge upward against said bias means and longitudinally with respect to said bracket;

and means including said bracket for mounting said cartridge to said tone arm.

3. In a phonograph for reproducing sound from records, a tone arm and cartridge assembly comprising:

a first elongated cartridge casing section having a channel formed longitudinally in one side thereof and having a notch extending transversely at least partially across another side thereof;

a second elongated cartridge casing section, having a channel formed longitudinally in one side thereof, for mating with said first section, the channels of said casing sections defining an interior cavity when said sections are in assembled relation;

means projecting from one of said casing sections and engaging the other of said sections for preventing longitudinal movement of such section with respect to one another;

a record engaging stylus;

transducer means occuping said cavity and having a portion thereof extending exteriorly of said casing to operatively engage said stylus for developing an electrical signal proportional to the physical movement of said stylus;

means for maintaining said cartridge casing sections in demountable assembled relation and consisting essentially of an elongated bracket comprising a first surface portion adjacent the side of said second casing section opposite that side mating with said first section and having a pair of parallel space opposed side portions depending from said first surface portion and terminating in inwardly facing tabs, said first surface portion of said bracket having a pair of tandem cut-out sections which are bent downwardly to form a pair of tandem bias tabs to engage said second cartridge casing section for yieldably urging said assembled cartridge firmly into engagement with said inwardly facing tabs and for preventing longitudinal movement of said cartridge with respect to said bracket means when said tabs reside in said notch of said first casing section and whereby said assembled cartridge is easily withdrawn from said bracket by simultaneously forcing said cartridge upward against said tandem bias tabs and longitudinally with respect to said bracket;

and means including said bracket for mounting said cartridge to said tone arm.

4. In a phonograph for reproducing sound from records, a tone arm and cartridge assembly comprising:

an elongated flexion transducing element;

a pair of electrical terminals each having a transverse hilt portion;

a longitudinally slotted mounting block, composed of an elastomer material, for receiving at a first end one end of said transducing element and for receiving at a second end said electrical terminals;

a first elongated casing section having a notch extending transversely at least partially across one side thereof and having a channel formed in another side thereof comprised of a portion for mating with said mounting block and portions extending oppositely from said mating channel portion for respectively passing said transducing element and said terminals, said terminal passing channel portion being further formed to receive said hilt portion of one of said electrical terminals in a manner preventing substantial longitudinal movement of said terminal therein;

a second elongated casing section, having a channel formed therein including a portion for receiving said mounting block, for mating with said first section;

a record engaging stylus;

means coupled to the remaining end of said transducing element for operatively engaging said stylus;

key and slot means provided on said casing section for preventing longitudinal movement of said sections with respect to one another;

means for maintaining said cartridge casing sections, said mounting block, said terminals and said transducing element in demountable assembled relation and consisting essentially of an elongated bracket comprising a first surface portion adjacent the side of said second casing section opposite that side mating with said first section and having a pair of parallel space opposed side portions depending from said first surface portion and terminating in inwardly facing tabs, said first surface portion of said bracket having a cut-out section which is bent downwardly to form a bias tab to engage said second cartridge casing section for yieldably urging said assembled cartridge firmly into engagement with said inwardly facing tabs and for preventing longitudinal movement of said cartridge with respect to said bracket means when said tab resides in said notch of said first casing section and whereby said assembled cartridge is easily withdrawn from said bracket by simultaneously forcing said cartridge upward against said bias tab and longitudinally with respect to said bracket;

and means including said bracket for mounting said cartridge to said tone arm.

5. In a phonograph for reproducing sound from stereo or monaural recordings, a tone arm and cartridge assembly comprising:

a pair of elongated flexion transducing elements;

two pairs of electrical terminals, each of said terminals having a transverse hilt portion;

a pair of longitudinally slotted mounting blocks of rectangular cross-section composed of an elastomer material, each of said blocks receiving at a first end one end of a respective one of said transducing elements and at a second end receiving a respective pair of said electrical terminals;

a first elongated casing section having a notch extending transversely at least partially across one side thereof and having a pair of adjacent channels formed in another side thereof, each channel comprised of a first portion for diagonally seating a respective one of said mounting blocks and channel portions extending oppositely from said first channel portion for respectively passing one of said transducing elements and one pair of said terminals, said terminal passing channel portion being further formed to receive said hilt portions of said electrical terminals in a manner preventing substantial longitudinal movement of said terminals therein;

a second elongated casing section, having a pair of adjacent channels formed in one side thereof in registry with the channels of said first casing section, for mating with said first section;

a record engaging stylus;

yoke means coupled to the remaining ends of each of said transducing elements for operatively engaging said stylus;

key and slot means provided on said casing sections for preventing longitudinal movement of said casing sections with respect to one another;

means for maintaining said cartridge casing sections, said mounting blocks, said terminals and said transducing elements in demountable assembled relation and consisting essentially of an elongated bracket comprising a first surface portion adjacent the side of said second casing section opposite that side mating with said first section and having a pair of parallel space opposed side portions depending from said first surface portion and terminating in inwardly facing tabs, said first surface portion of said bracket having a cut-out section which is bent downwardly to form a bias tab to engage said second cartridge casing section for yieldably urging said assembled cartridge firmly into engagement with said inwardly facing tabs and for preventing longitudinal movement of said cartridge with respect to said bracket means when said tab resides in said notch of said first casing section and whereby said assembled cartridge is easily withdrawn from said bracket by simultaneously forcing said cartridge upward against said bias tab and longitudinally with respect to said bracket;

and means including said bracket for mounting said cartridge to said tone arm.

No references cited.

LEONARD FORMAN, *Primary Examiner.*

F. J. D'AMBROSIO, *Assistant Examiner.*